Patented Sept. 10, 1935

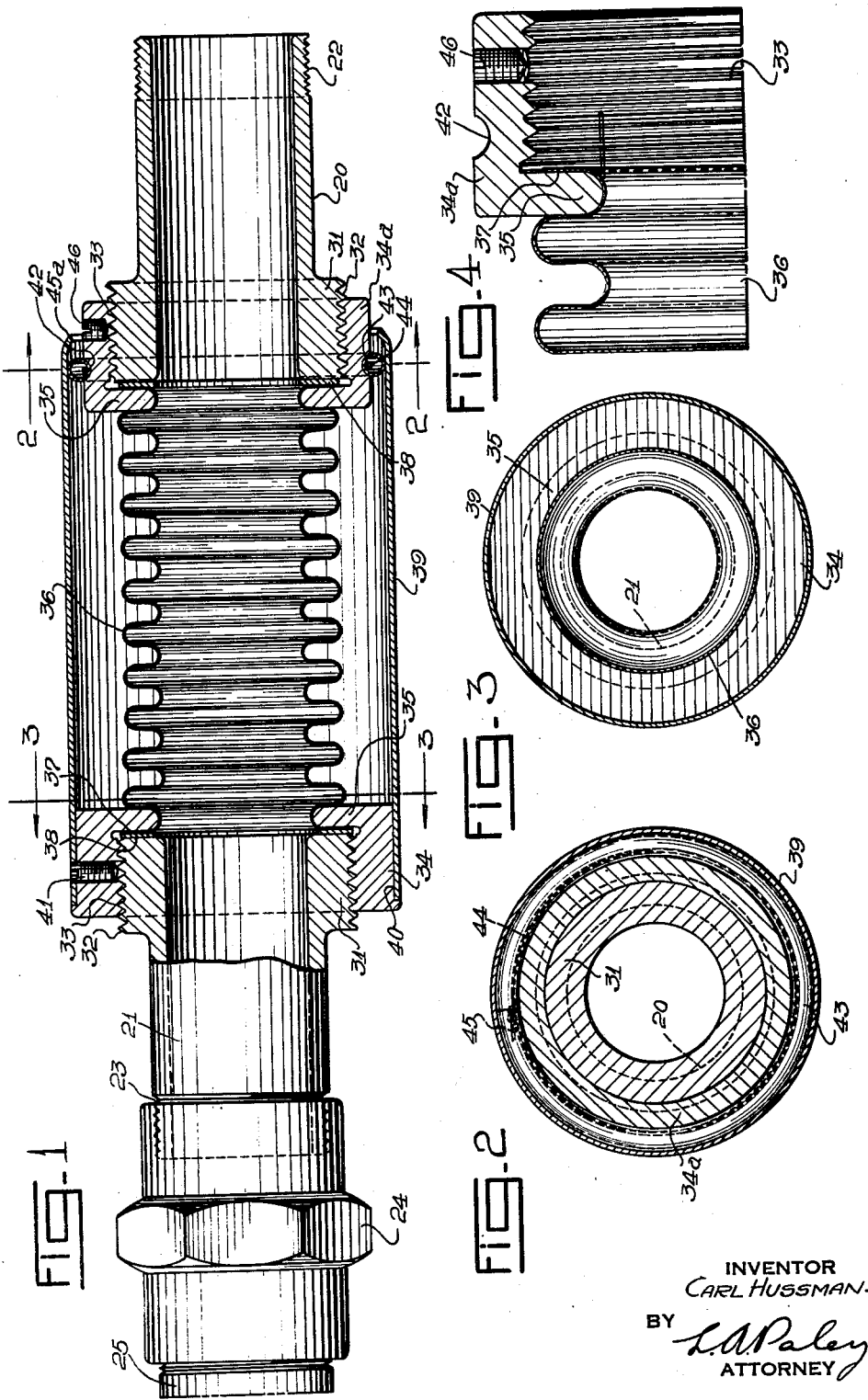

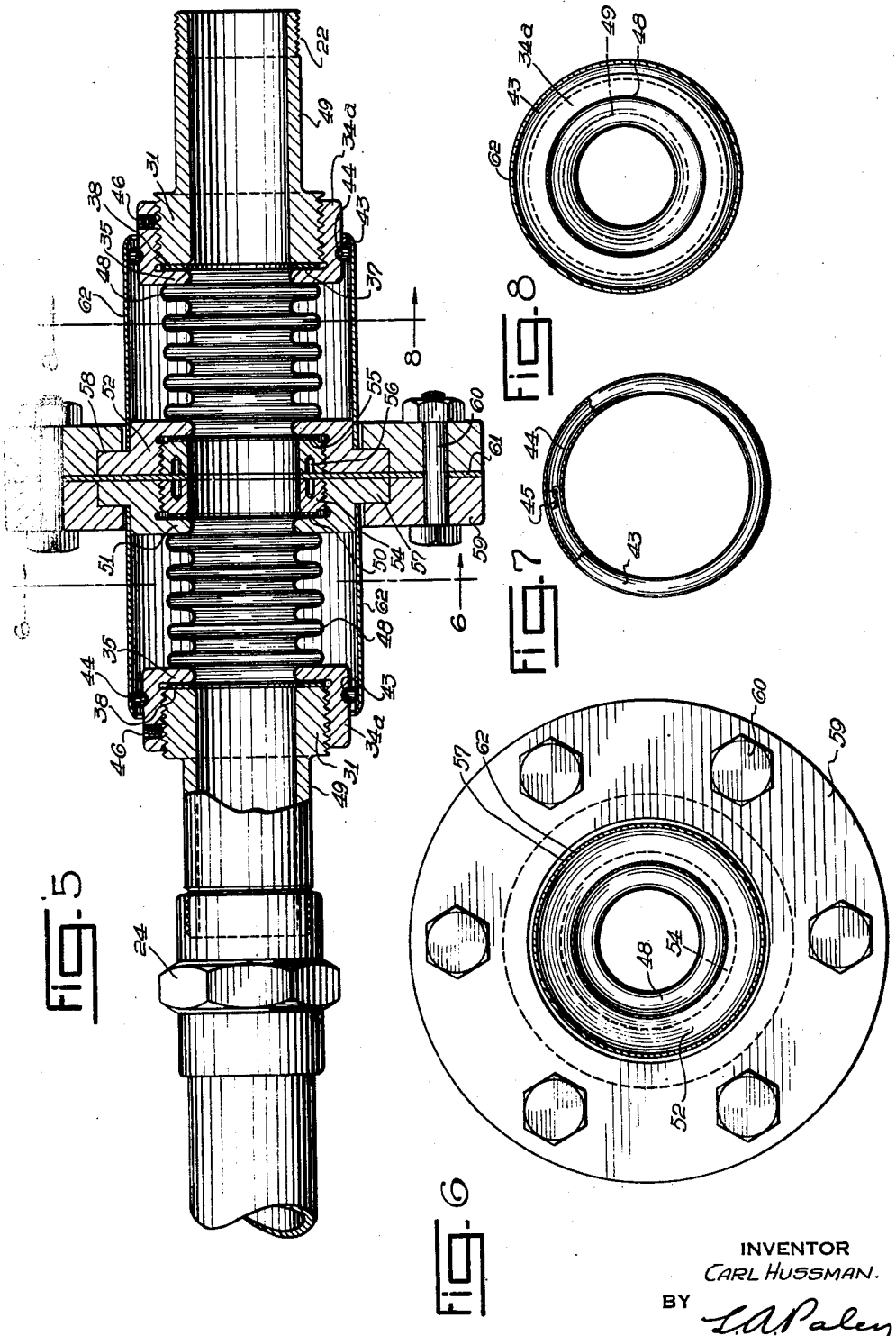

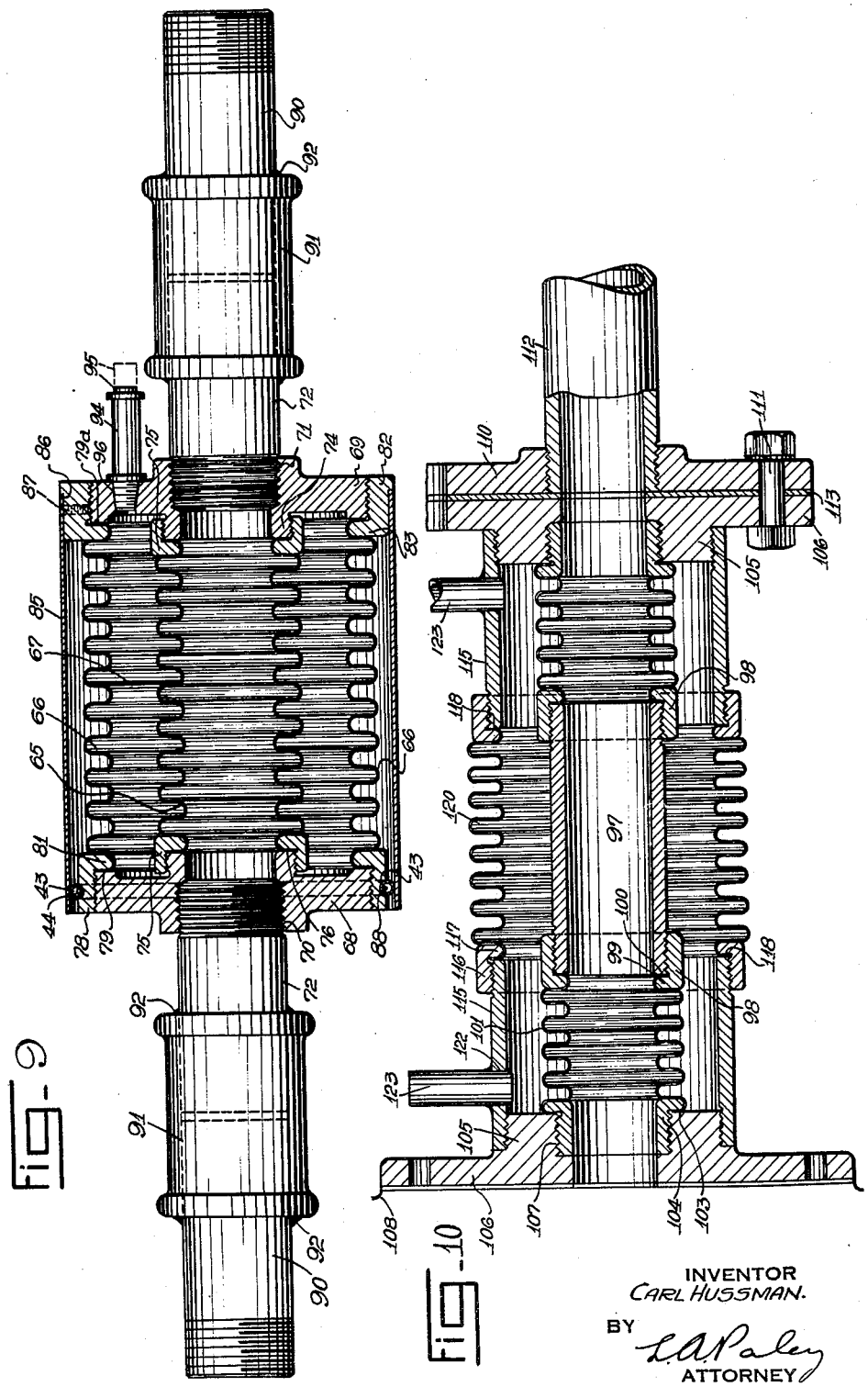

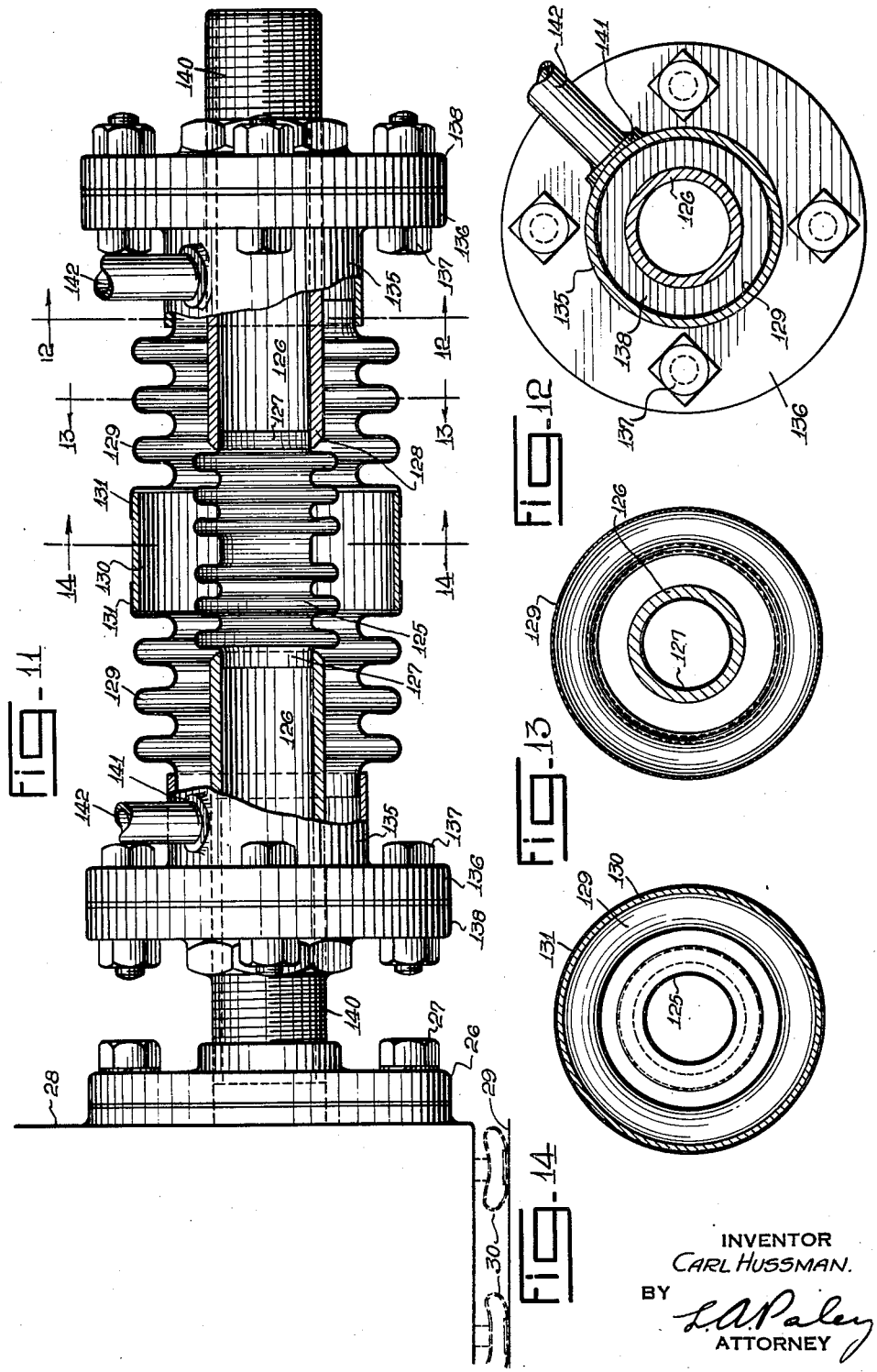

2,014,355

UNITED STATES PATENT OFFICE 2,014,355

VIBRATION ISOLATING PIPE CONNECTION

Carl Hussman, Chicago, Ill., assignor to United States Gypsum Company, Chicago, Ill., a corporation of Illinois Application February 27, 1933, Serial No. 658,677

3 Claims. (Cl. 285—90)

This invention relates to pipe connections, and has reference more particularly to pipe connections containing flexible means for checking the transfer of vibration of machines from one section of the pipe to another.

It is commonly necessary to supply fluids, such as steam, water, etc., to machinery such as motors and engines, and to also provide for the escape fluids, such as exhaust gas, etc., from said machinery. It is a practice to support the machinery upon vibration isolating bases so as to prevent the transfer of the vibrations from the moving machinery to the supporting structures as shown in the patent to Balduf No. 1,958,778. However, it has been heretofore difficult to prevent the transfer of vibration along the pipes leading to the machinery, which serve to transfer the fluid to and from the moving machinery.

An object of this invention, therefore, is to provide a flexible connection in the pipe lines connected with the machinery so that all vibration is prevented from being transferred along the pipes to the supporting structures.

Another object of the invention is to provide a flexible coupling which may be installed in a pipe line without throwing twisting stresses into the flexible coupling.

Another object of the invention is to provide a flexible coupling for pipe lines handling hot fluids such as exhaust gases, in which provision is made for water-cooling the flexible coupling to prevent its being injured by the heat of the gases.

A further object of the invention is to provide a flexible coupling for pipe lines consisting of a double wall flexible bellows which has a high factor of safety in that, if the inner flexible bellows fails, the outer bellows will still confine the fluid under pressure; also to improve flexible pipe connections in other respects hereinafter specified and claimed.

Reference is to be had to the accompanying drawings, forming a part of this specification, in which Fig. 1 is a central sectional view through a preferred form of my improved flexible coupling, Fig. 2 is a transverse sectional view through the coupling taken on line 2—2 of Fig. 1, Fig. 3 is a transverse sectional view through the coupling taken on line 3—3 of Fig. 1, Fig. 4 is a large scale sectional view through the coupling, showing certain details of construction, Fig. 5 is a longitudinal sectional view through a modified form of flexible coupling, Fig. 6 is a transverse sectional view through the coupling taken on line 6—6 of Fig. 5, Fig. 7 is an elevation, partly in section, showing a preferred form of tubular gasket used in connecting the protective shell of the coupling with the inner bellows structure, Fig. 8 is a transverse sectional view through the coupling, taken on lines 8—8 of Fig. 5, Fig. 9 is a longitudinal sectional view through a further modified form of flexible pipe connection, in which a double bellows is used, Fig. 10 is a longitudinal sectional view through a further modified form of flexible pipe connection, in which cooling water is used around the inner flexible bellows, Fig. 11 is a longitudinal sectional view through a still further modified form of flexible pipe connection, employing a water-cooled bellows, Fig. 12 is a transverse sectional view through the pipe connection, taken on line 12—12, of Fig. 11, Fig. 13 is a transverse sectional view through the coupling taken on line 13—13 of Fig. 11, and Fig. 14 is a transverse sectional view through the coupling taken on line 14—14 of Fig. 11.

In its simplest embodiment, my improved vibration isolating pipe connection takes the form shown in Figs. 1-4. A pair of coaxial pipe sections 20 and 21 are provided with threads 22 and 23, respectively, at one end for receiving a standard screw union 24, which connects to pipe lengths 25. One of the pipe lengths 25 may be connected to a flange 26 (Fig. 11) which is secured by bolts 27 to a moving machine 28 which is subject to vibration by reason of its moving parts. The machine 28 is preferably supported on a floor structure 29 by means of resilient, flat spring clips 30 preferably in the form of opposed resilient loops, so that vibration will not be transmitted from the vibrating machine 28 to the floor structure 29.

Each of the pipe sections 20 and 21 has an inner annular shoulder 31 of larger diameter than the pipe section, said shoulder being provided with external threads 32 for engaging internal threads 33 formed on bellows attaching nuts 34 and 34a. An annular flange 35 is formed on the inner edge of the each nut 34 and 34a, and the end convolutions of a bellows 36 are formed about the flanges 35 to provide annular bellows flanges 37. An annular packing gasket 38 is preferably interposed between each of the flanges 35 and its corresponding shoulder 31, so that when the nuts 34 and 34a are drawn up tight, a fluid tight joint will be provided between the bellows 36 and the pipe sections 20 and 21.

A cylindrical protecting sleeve 39 extends about the bellows 36 and is seated at one end in an annular recess 40 formed around the nut 34, a set screw 41 serving to prevent the sleeve 39 from slipping off the nut 34 and also serving to prevent the nut 34 from being unscrewed from the shoulder 31. An annular groove 42 is formed around the nut 34a to receive a rubber gasket tube 43, the latter preferably being held firmly in place by a wire 44 having a twist 45. The outer periphery of the tube 43 resiliently engages the inside surface of the end of the sleeve 39 adjacent nut 34a, so as to keep dust and water away from the outside of the bellows 36 and yet without reducing the vibration absorption efficiency of the unit. The outside end of the sleeve 39 adjacent the tube 43 is preferably formed into an inwardly extending flange 45a serving to partially conceal the tube 43 and present a neat, finished appearance. A lock screw 46 is preferably provided in the nut 34a.

The resilient bellows 36 is preferably made of very light gauge metal in order to obtain the maximum effectiveness from the standpoint of vibration absorption. I prefer to use brass for the bellows 36, this brass containing about 80% copper and 20% zinc. This alloy has been chosen on account of its desirable spring characteristics and its remarkable ability to absorb machine vibration. Another alloy which may be used with satisfaction is one containing 96% copper, 3% silica and 1% manganese. This alloy also has excellent vibration absorption characteristics and effectively resists the corrosive effect of sea water.
The mechanical gasket and nut connection for the ends of the bellows 36 is preferred to a soldered connection since the solder connection has been found unreliable and to constitute a weak point in the resilient connection, no matter how carefully the solder is applied, where severe vibration conditions must be met.

In the type of construction shown in Figs. 5, 6 and 8, special provision is made to prevent any damaging twisting strains from being placed on the bellows as the connecting unions 24 are tightened up. In this form of connection, two coaxial bellows 48 are used. The outer end of each bellows 48 is connected to a pipe section 49 in a manner preferably exactly like the construction shown near the right hand end of Fig. 1. The inner ends of the bellows 48 each have an annular flange 50 which seats between an annular flange 51 formed on a ring 52, and an internal ring nut 54 which is threaded externally to screw into the inside of the ring 52. An annular gasket 55 is interposed between the flange 50 and the nut 54, so that when said nut is tightened by the use of a spanner wrench engaging in openings 56 formed in each of the nuts 54, a fluid tight joint with the bellows 48 will be produced. A laterally extending, annular shoulder 57 is formed on the inside edge of each of the rings 52, each of said shoulders engaging within a recess 58 formed in each of a pair of clamping flanges 59. A series of bolts 60 connect the flanges 59, a gasket 61 being preferably provided between flanges 59, rings 52 and nuts 54 in order to make a tight joint. Sleeves 62 engage at their inner ends with the outer periphery of the rings 52, and cooperate at their outer ends with rubber tubes 43 to provide a dust, moisture and damage proof protection for the bellows 48, preferably in the same manner as described in connection with Fig. 1.

In the form of flexible connection shown in Fig. 9, provision is made to insure a large factor of safety in conducting fluids to or from apparatus subject to movement. To this end there are provided a plurality of coaxial, concentrically positioned bellows, preferably of substantially different diameters and comprising inner bellows 65 and outer bellows 66 providing a substantial chamber 67 therebetween for receiving and confining fluids escaping due to rupture of bellows 65.

In construction, this form of vibration isolating unit preferably comprises annular end flanges 68 and 69, which are internally threaded at 70 and 71 to receive threaded pipe extensions 72. End flanges 68 and 69 are each provided with an annular shoulder 74 externally threaded to receive clamping nuts 75, which engage annular flanges 76 formed at each end of inner bellows 65 to secure said bellows against the shoulders 74 of said end flanges 68 and 69 to form a continuous, closed connection between pipe extensions 72. Similarly to the construction described in Fig. 1, attaching nut 78 is threadedly engaged at the outer periphery of end flange 68 for attaching one end of bellows 66 by clamping laterally extending flange 79, formed on the end convolution of bellows 66, between end flange 68 and annular flange 81 formed on said nut 78. The opposite end of the bellows 66 is secured against end flange 69 by tightening nut 82 which is threadedly engaged on the periphery of end flange 69, whereby annular flange 83 of said nut 82, which engages laterally extending flange 79a of bellows 66, clamps the same against the end flange 69. To protect the outer bellows 66 from dirt or damage, there is preferably provided cylindrical sleeve 85, one end of said sleeve being seated in an annular recess 86 formed around the outer periphery of nut 82 and being retained in place by set screw 87, which extends through nut 82 to the threaded periphery of flange 69 to lock nut 82 against rotation. The other end of sleeve 85 engages the resilient outer periphery of a gasket tube 43 seated in an annular recess 88 formed in nut 78. In order to prevent any possible twisting stresses to be imparted to the relatively delicate bellows members 65 and 66 in connecting up the vibration isolating unit in a pipe line 90, a sleeve union 91 is preferably employed to connect either or both pipe extensions 72 to the pipe 90, solder 92, or the like, being preferably employed to form a secure joint.

The fatigue point of the preferred type of bellows disclosed herein, that is, the point at which the material of the bellows ruptures due to a given amount of wear and tear caused by vibration, increases as the diameter of the bellows is increased. Thus, it will be seen that in the embodiment described in Fig. 9 the fatigue point of the outer bellows 66 will be considerably above that of the inner bellows 65 even though each bellows receives the same vibrational impulses. While the inner bellows 65 will be of sufficient durability to withstand the usages to which the vibration isolating unit is to be applied, yet, should the same become ruptured for any reason, the outer bellows 66 will act as an auxiliary casing to retain fluids escaping from the bellows 65. This construction is of particular utility where the fluids escaping from the bellows 65 would cause damage to adjacent apparatus, or where the unit is located at some obscure point so that any leakage would not be readily observed. Likewise, this type of unit finds ready applicability where a repair to the ruptured bellows necessitates a shut-down of the apparatus in order to effect the same. This vibration isolating construction is also of benefit as a measure of precaution where the destructive effects of the fluids upon the bellows is uncertain so that a replacement time cannot be determined beforehand.

In order to provide visible indication that fluids are leaking through the bellows 65, there is preferably provided a gauge 94 connecting with the chamber 67 and having a suitable, visible indicator 95, which will be forced to the dot and dash positon, shown in Fig. 9, by the pressure created in the chamber 67 by the fluids entering therein. Gauge 94 may be threadedly engaged in a suitable aperture 96 provided in end flange 69. This gauge 94 is then positioned with relation to the other apparatus in such a manner that the indicator 95, which may be suitably colored to attract attention, may be readily observed by an operator. Any suitable type of gauge may, of course, be employed, but the type described has been found simple and well suited for the purpose.

The modified forms of the invention illustrated in Figs. 10 through 14, provide for circulating a cooling or heating medium about the pipe ends and/or vibration isolating bellows conducting fluids to or from the moving apparatus. Vibration isolating units of this type are particularly desirable where the fluids, such as steam, water, or exhaust gases are of such a temperature as to have a damaging effect upon the bellows, which must, of necessity, be of a relatively delicate construction to be effectively sensitive to vibrations or movements. Of course, the function of the circulating fluid may be reversed under appropriate circumstances to function as a pre-heating expedient, where this becomes desirable, and, therefore, where the term "cooling jacket" is used it is to be construed generically.

In the form of the invention shown in Fig. 10, there is provided an insert pipe or cylinder 97 each end of which is preferably threaded to receive attaching nuts 98 provided with annular flanges 99 for engaging and clamping laterally extending flanges 100, formed on the ends of bellows sections 101, against the ends of the insert cylinder 97. The opposite ends of bellows 101 are preferably provided with inwardly extending annular flanges 103 which are engaged by screw flanges 104, which clamp said flanges 103 against shoulders 105 formed on companion flanges 106, the screw flanges 104 being threadedly engaged within suitable threaded apertures 107 formed in shoulders 105. As illustrated, one of the flanges 106 may be attached to a base 108, such as an apparatus, or the like, subject to vibratory movement; and the other flange 106 may be attached to a companion flange 110 by means of bolts 111, to provide a coupling with the pipe 112, which is threaded into flange 110, a gasket 113 being interposed between said flanges 106 and 110 in order to provide a tight connection.

The cooling jacket preferably comprises jacket sections 115, each threaded at one end and screwed onto externally threaded shoulders 105 of the flanges 106. The opposite ends of the sections 115 are externally threaded to receive attaching nuts 116, having flanges 117 for engaging laterally extending, annular flanges 118 provided at each end convolution of jacket bellows 120. Suitable apertures 122 are provided in the jacket sections 115 to form inlet or outlet ports in which are received nipples or pipes 123, suitably secured in place by a threaded connection or by welding or soldering.

In the modified form of the invention illustrated in Fig. 11, a bellows 125 is connected between a pair of spaced pipe sections 126, each end of the bellows being provided with an outstanding annular flange 127, which is soldered to the inside of the corresponding pipe end 128. In this modified form of the invention, the cooling jacket preferably comprises a pair of bellows sections 129 separated by a cylinder 130, to which said bellows are connected by means of outwardly extending flanges 131, preferably soldered to the outer periphery of the cylinder 130 adjacent each edge of said cylinder. The opposite ends of the bellows sections 129 are preferably attached by means of soldering to the inner surface, adjacent the ends, of housings 135. Housings 135 are provided with flanges 136 connected by means of bolts 137 to companion flanges 138, the flanges 138 being screwed onto the pipe sections 126, which are each provided with a threaded portion 140. Suitably apertured ports 141 are provided in the housings 135 to receive pipes 142, through which the cooling or heating fluid is transported to and from the device.

The forms of the invention illustrated in Figs. 10 and 11 provide for a continuous circulation of the cooling or heating fluid, as the case may be, the fluid being permitted to completely envelop the inner bellows. The modification shown in Fig. 11 is intended for what may be classed as normal conditions, where there is no very great vibration of the machinery and where there is consequently no excessive wear and tear upon the vibration isolating unit. For this purpose, the soldered joint between the bellows and the pipe section will stand up very well. However, where the amplitude of vibration which the isolating unit must absorb is relatively high, where high temperatures are encountered, and where the disalignment which the isolation unit must be capable of withstanding is relatively high, it is preferred to employ the form of the invention shown in Fig. 10, as the clamped joints are more secure and better qualified to withstand the more severe conditions to which the unit will be subjected. It is also to be observed that the form of the invention shown in Fig. 10 has a greater disalignment allowance, due to its more flexible construction.

In order to obtain the greatest efficiency from any form of the vibration isolating pipe connection of my invention, the end of the pipe section, which is separated from the pipe that is connected to the moving machinery, is preferably rigidly connected to a wall or other support. This positively held section in effect forms a rigid base to which the bellows is attached at one end, the opposite end of the bellows being connected to that portion of pipe associated with and subject to the vibrations and oscillations of the moving machine. Thus, repeated vibrations or oscillations will be prevented from building up corresponding movements in the pipe which is separated from the machine by the vibration isolating connection; but the flexible bellows, which form the only direct connection between the parts, will be caused to flex and thereby prevent the movements from being transmitted. Where fluids under considerable pressure are conveyed through the pipes, the rigid retention of the one pipe section will also prevent the flexibly connected pipes from being forced apart. The enclosing member about the bellows is in each instance in such relationship to the other parts of the structure that while it functions either as a fluid casing or simply as a protective covering, there is sufficient flexibility in the member itself or in the connection between the member and other parts of the assembly to permit longitudinal and lateral movement of the separated pipe ends or sections for the purpose described.

I wish to state in conclusion, that while the illustrated forms of the invention, which I have described, present certain practical embodiments, I do not desire to limit myself precisely to these details, since manifestly, the same may be considerably varied without departing from the spirit of the invention as defined in the appended claims.

Having thus described my invention, I claim as new and desire to secure by Letters Patent:—

1. In a vibration isolating pipe connection, a corrugated, metallic, annular bellows connected at each end to a pipe section, a cylindrical sleeve extending concentrically about said bellows and rigidly secured at one end to one of said pipe sections, and an annular, flexible gasket between the other end of said sleeve and the other of said pipe sections.

2. The combination with a moving machine subject to vibration, of a fluid pipe conveyor leading to said machine, a corrugated flexible bellows connected into a length of said pipe so as to prevent transmission of vibrations from said machine to supporting structure, and an enclosing member about said bellows and rigidly secured at one end to said pipe, said member being flexibly connected at the opposite end thereof to other parts of the assembly to prevent metal-to-metal contact and permitting relative longitudinal and lateral movement between the parts of the pipe.

3. In a structure of the class described, spaced apart pipe sections, a flexible element connecting said pipe sections, an enclosing member about said element, said member being connected adjacent one of said sections and being maintained in laterally spaced relation relative to the other of said sections, and annular, resilient gasket means between the last mentioned section and said member.

CARL HUSSMAN.